US012752355B2

(12) United States Patent
Reth et al.

(10) Patent No.: US 12,752,355 B2
(45) Date of Patent: Oct. 6, 2026

(54) POWER TOOL SHOE AND DUST PORT

(71) Applicant: BLACK & DECKER INC., New Britain, CT (US)

(72) Inventors: Anthony D. Reth, Middle River, MD (US); Brent A. Kuehne, Red Lion, PA (US); Joshua D. Woods, Middle River, MD (US); Brandi A. Dudrick, Baltimore, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 18/846,589

(22) PCT Filed: Sep. 14, 2023

(86) PCT No.: PCT/US2023/074223

§ 371 (c)(1),
(2) Date: Sep. 12, 2024

(87) PCT Pub. No.: WO2024/059727

PCT Pub. Date: Mar. 21, 2024

(65) Prior Publication Data

US 2025/0214158 A1 Jul. 3, 2025

Related U.S. Application Data

(60) Provisional application No. 63/375,556, filed on Sep. 14, 2022.

(51) Int. Cl.
*B23D 45/16* (2006.01)
*B23D 59/00* (2006.01)
(Continued)

(52) U.S. Cl.
CPC ........... *B23D 59/006* (2013.01); *B23D 45/16* (2013.01); *B23D 59/0064* (2024.05); *B27B 9/02* (2013.01); *B27G 19/04* (2013.01)

(58) Field of Classification Search
CPC .. B23D 45/16; B23D 59/0064; B23D 45/003; B23D 59/006; B23D 59/002; B27B 9/02; B27G 19/04
(Continued)

(56) References Cited

U.S. PATENT DOCUMENTS 2,562,396 A 7/1951 Shutz
2,866,485 A * 12/1958 Anton ................. B23D 49/162 83/628

(Continued)

FOREIGN PATENT DOCUMENTS

CN 301536002 S 5/2011
CN 103537753 A 1/2014

(Continued)

OTHER PUBLICATIONS

International Search Report and Written Opinion, PCT Application No. PCT/US2023/074014, Dec. 12, 2023, 8 pages, USPTO.

(Continued)

*Primary Examiner* — Ghassem Alie
(74) *Attorney, Agent, or Firm* — Harness, Dickey & Pierce, P.L.C.; Timothy J. Martin; Michael J. Aronoff

(57) ABSTRACT

A rotary cutting tool includes a battery pack receptacle, a handle, a motor, a cutting wheel driven by the motor, a blade guard surrounding the cutting wheel and a shoe. The shoe includes a base and an attachment portion. The base abuts a workpiece and provide a depth of cut. The attachment portion is perpendicular to the base. The attachment portion is welded to the base.

16 Claims, 16 Drawing Sheets

(51) Int. Cl.
*B27B 9/02* (2006.01)
*B27G 19/04* (2006.01)

(58) Field of Classification Search
USPC ....... 30/388, 390, 391; 83/100, 520; 125/13, 125/14; 51/273
See application file for complete search history.

(56) References Cited

U.S. PATENT DOCUMENTS

| | | | | |
|---|---|---|---|---|
| 2,980,152 | A | 4/1961 | Edwin | |
| 3,623,518 | A | 11/1971 | Nicotra | |
| 3,722,496 | A | 3/1973 | Schuman | |
| 3,882,598 | A | 5/1975 | Earle et al. | |
| 4,022,182 | A | 5/1977 | Lenkevich | |
| 4,353,165 | A | 10/1982 | Albery | |
| 5,074,044 | A * | 12/1991 | Duncan | B23Q 11/0046 30/390 |
| 5,758,425 | A | 6/1998 | Gallagher et al. | |
| 6,161,293 | A | 12/2000 | Watson | |
| 6,167,626 | B1 * | 1/2001 | Doumani | H05B 41/392 30/390 |
| 9,009,982 | B1 | 4/2015 | Sedgwick | |
| D876,916 | S | 3/2020 | Matson et al. | |
| 11,077,507 | B1 | 8/2021 | Matson et al. | |
| 11,577,328 | B1 * | 2/2023 | Matson | B23D 59/0064 |
| 2006/0169111 | A1 * | 8/2006 | Kozlowski | B23D 59/003 83/13 |
| 2008/0244910 | A1 * | 10/2008 | Patel | B27G 19/04 30/377 |
| 2009/0071017 | A1 | 3/2009 | Gehret | |
| 2009/0183377 | A1 * | 7/2009 | Loveless | B27G 19/04 30/390 |
| 2010/0058911 | A1 | 3/2010 | Goddard | |
| 2010/0269353 | A1 * | 10/2010 | Martin | B27G 19/04 30/390 |
| 2010/0325903 | A1 | 12/2010 | Patel | |
| 2011/0185581 | A1 * | 8/2011 | Xing | B25F 5/02 30/390 |
| 2011/0214302 | A1 | 9/2011 | Inayoshi | |
| 2013/0283622 | A1 | 10/2013 | Eto et al. | |
| 2014/0208600 | A1 * | 7/2014 | Moreno | B23Q 5/027 30/388 |
| 2015/0336287 | A1 | 11/2015 | Brown et al. | |
| 2019/0388984 | A1 | 12/2019 | Kuragano | |
| 2021/0205905 | A1 | 7/2021 | Thackery et al. | |
| 2022/0241877 | A1 | 8/2022 | Osada et al. | |
| 2023/0037512 | A1 | 2/2023 | Du et al. | |
| 2025/0153258 | A1 | 5/2025 | Matson et al. | |
| 2025/0214158 | A1 | 7/2025 | Reth et al. | |
| 2025/0222617 | A1 | 7/2025 | Reth et al. | |

FOREIGN PATENT DOCUMENTS

| | | | | |
|---|---|---|---|---|
| CN | 104668657 | A | 6/2015 | |
| CN | 104772522 | A | 7/2015 | |
| CN | 303488493 | S | 12/2015 | |
| CN | 206083993 | U | 4/2017 | |
| CN | 107081473 | A | 8/2017 | |
| CN | 207326067 | U | 5/2018 | |
| CN | 108907338 | A | 11/2018 | |
| EP | 2965865 | A2 | 1/2016 | |
| JP | H03117796 | U | 12/1991 | |
| WO | 11104538 | A1 | 9/2011 | |
| WO | WO-2021241737 | A1 * | 12/2021 | B23D 45/16 |
| WO | 24059727 | A1 | 3/2024 | |

OTHER PUBLICATIONS

International Search Report and Written Opinion, PCT Application No. PCT/US2023/074223, Dec. 20, 2023, 8 pages, USPTO.

* cited by examiner

POWER TOOL SHOE AND DUST PORT

RELATED APPLICATIONS

This application claims the benefit of and priority under 35 U.S.C. § 119(e) to PCT Patent Application No. PCT/US2023/074223, filed Sep. 14, 2023, titled "Power Tool Shoe and Dust Port," which claims priority to U.S. Provisional Patent Application No. 63/375,556, filed Sep. 14, 2022, titled "Power Tool Shoe and Dust Port," which is herein incorporated by reference in its entirety.

FIELD OF THE INVENTION

The present invention relates to construction tools such as small rotary cutting tool such as a cut-off tool.

BACKGROUND

There are various existing cutting tools. It is desired to provide a cutting device with an efficient shoe structure and an efficient dust removal port.

SUMMARY

According to one aspect, the present disclosure describes an exemplary embodiment of a rotary cutting tool. The rotary cutting tool includes a battery pack receptacle; a handle; a motor; a blade driven by the motor; a blade guard surrounding the blade; and a shoe.

The shoe may include a base and an attachment portion.

The base may be configured to abut a workpiece and provide a depth of cut.

The attachment portion may perpendicular to the base.

The attachment portion may be welded to the base.

The base may include a flat portion for contacting the workpiece.

The base may include a ridge or lip surrounding the flat portion.

The flat portion may surround an opening configured to allow a blade to project through to cut or grind the workpiece.

The attachment portion may include a first projection.

The base may include a first hole.

The first projection may be engaged with the first hole.

The attachment portion may be welded to the base at the engagement of the first hole and the first projection.

The attachment portion may include a second projection.

The base may include a second hole.

The second projection may be engaged with the second hole.

The attachment portion may be welded to the base at the engagement of the second hole and the second projection.

The base may have a front width and a rear width.

The rear width may be smaller than the front width.

The front width may be less than 8 cm.

The front width may be less than 6 cm.

According to another aspect, the present disclosure describes an exemplary embodiment of a rotary cutting tool. The rotary cutting tool includes a battery pack receptacle, a handle, a motor, a blade driven by the motor, a blade guard surrounding the blade and a shoe.

The shoe may include a base and an attachment portion.

The base may include a flat portion configured to abut a workpiece and provide a depth of cut.

The attachment portion may be perpendicular to the base.

The base may have a front width and a rear width.

The rear width may be smaller than the front width.

The front width may be 8 cm or less.

The base portion and the attachment portion may be integrally formed.

The base portion and the attachment portion may include two parts welded together.

The attachment portion may include a first projection.

The base may include a first hole.

The first projection may be engaged with the first hole.

The attachment portion may be welded to the base at the engagement of the first hole and the first projection.

The attachment portion comprises a second projection;

The base may include a second hole.

The second projection may be engaged with the second hole.

The attachment portion may be welded to the base at the engagement of the second hole and the second projection.

The front width is less than 6 cm.

The rear width is less than 4 cm.

The attachment portion may include a central portion and two side portions.

The two side portions may be generally parallel to one another.

The central portion may be generally perpendicular to the two side portions.

According to another aspect, there is an exemplary embodiment of a rotary cutting tool, including a battery pack receptacle; a handle; a motor; a wheel driven by the motor; a blade guard surrounding the wheel; and a shoe. The shoe may include a base and an attachment portion. The base may include a flat portion and is configured to abut a workpiece and provide a depth of cut. The attachment portion may be perpendicular to the base. The blade guard may include a dust port configured to direct dust away from the wheel.

The dust port may be disposed at a forward end of the blade guard.

The dust port may include a dust port inlet and a dust port outlet.

The dust port may include a horizontal portion.

The horizontal portion may be generally parallel to a rotational axis of the motor.

The dust port outlet may be at an end of the horizontal portion.

The dust port may further include a vertical portion in communication with the horizontal portion.

The vertical portion may be transverse to the horizontal portion.

A central axis of the outlet of the dust port may be below a top edge of the blade guard.

The central axis of the outlet of the dust port may be above a bottom of the guard.

The central axis of the outlet of the dust port may be closer to the bottom of the guard than the top of the guard.

The horizontal portion of the dust port may be at least 5 millimeters long.

The horizontal portion of the dust port may be at least 10 millimeters long.

According to another aspect of the present application there is an exemplary embodiment of a rotary cutting tool, including a battery pack receptacle; a handle; a motor; a cutting wheel driven by the motor and configured to cut or grind a workpiece; a blade guard surrounding the cutting wheel; and a shoe. The shoe may include a base and an attachment portion. The base includes a flat portion that may be configured to abut a workpiece and provide a depth of cut.

The attachment portion may be perpendicular to the base.

The base may have a front width and a rear width.

The front width may be 8 cm or less.

The blade guard may include a dust port configured to direct dust away from the wheel.

The dust port may be disposed at a forward end of the blade guard.

The dust port may include a dust port inlet and a dust port outlet.

The dust port may include a horizontal portion.

The horizontal portion may be generally parallel to a rotational axis of the motor.

The dust port outlet may be at an end of the horizontal portion.

The dust port may further include a vertical portion in communication with the horizontal portion.

The vertical portion may be transverse to the horizontal portion.

A central axis of the outlet of the dust port may be below a top edge of the blade guard.

DETAILED DESCRIPTION OF EXEMPLARY EMBODIMENTS

Figure 1:
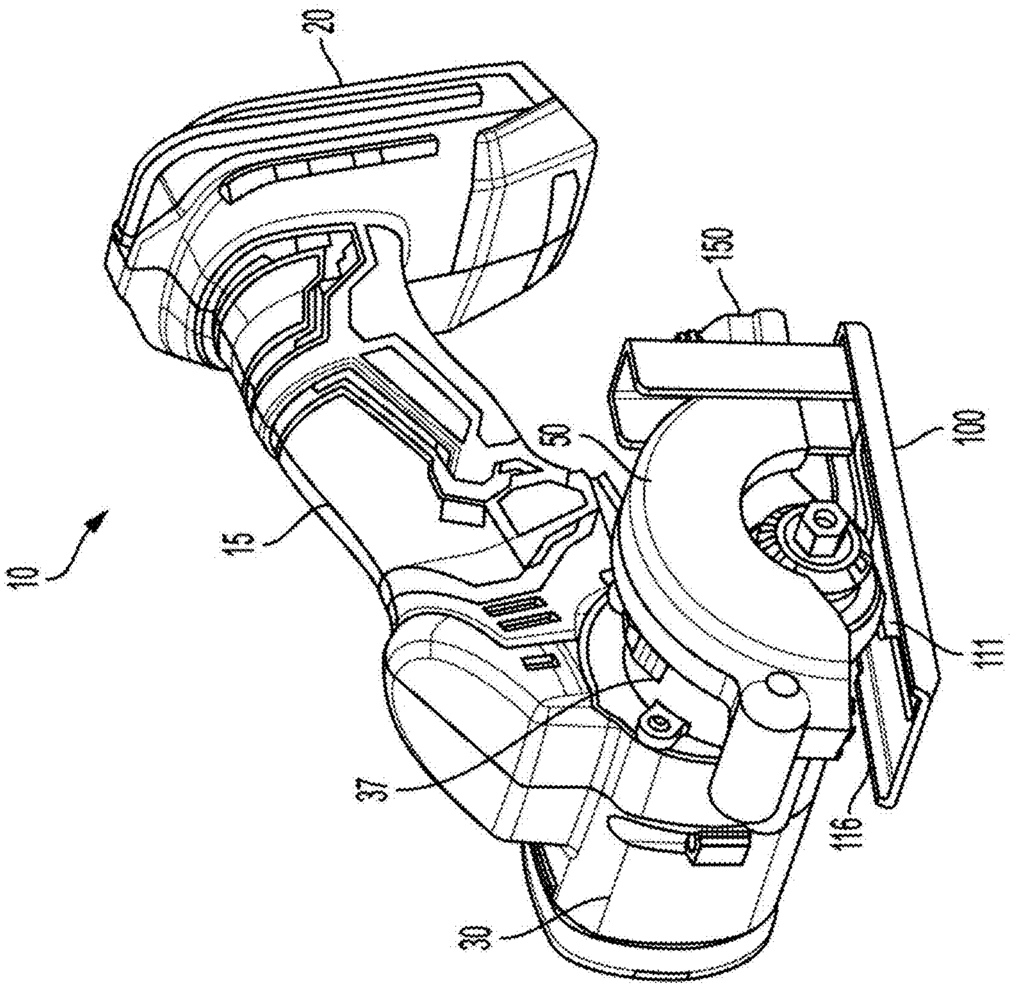
FIG. 1 illustrates a perspective view of an exemplary embodiment of a rotary cutting tool.
Figure 2:
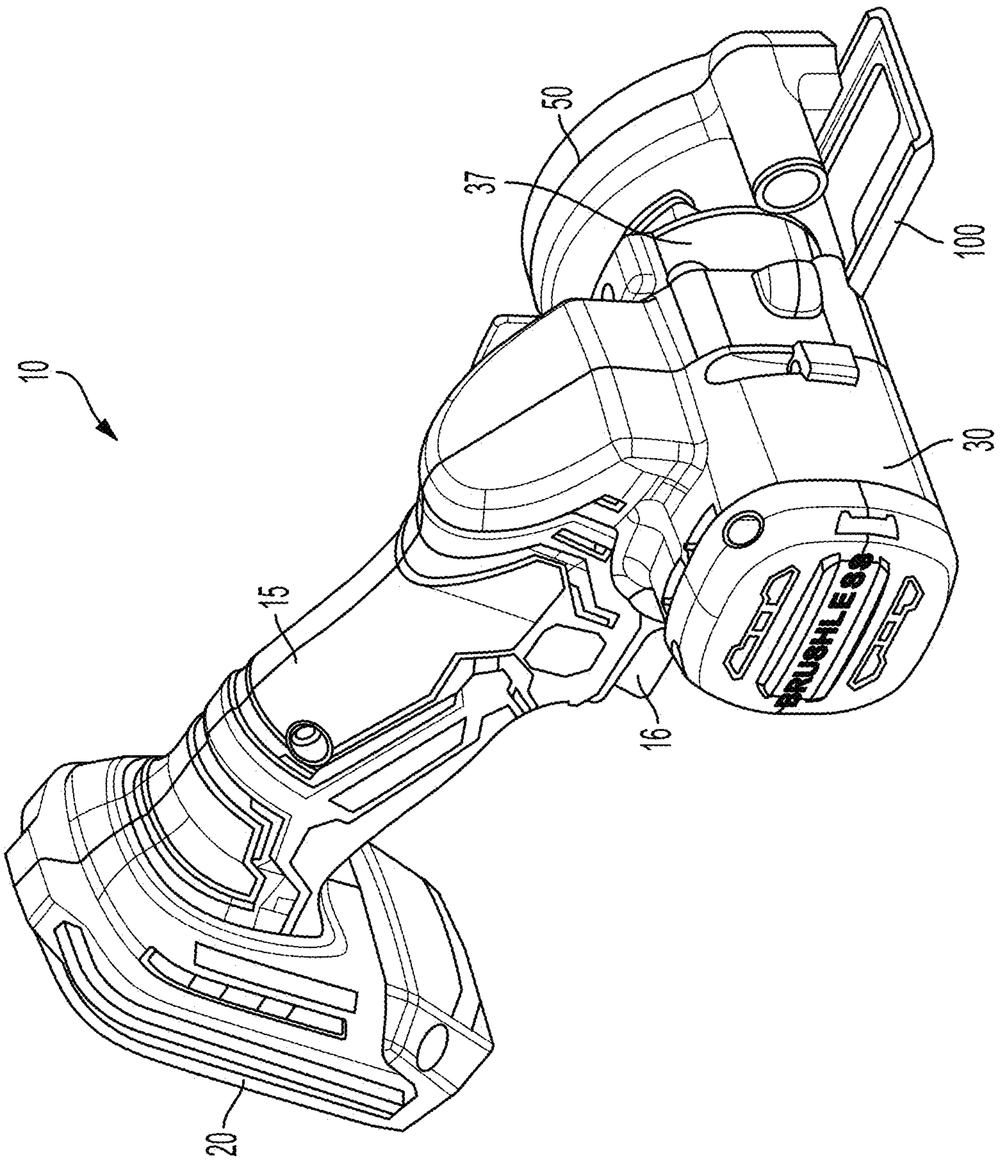
FIG. 2 is another perspective view of the exemplary embodiment of a rotary cutting tool.
Figure 3:
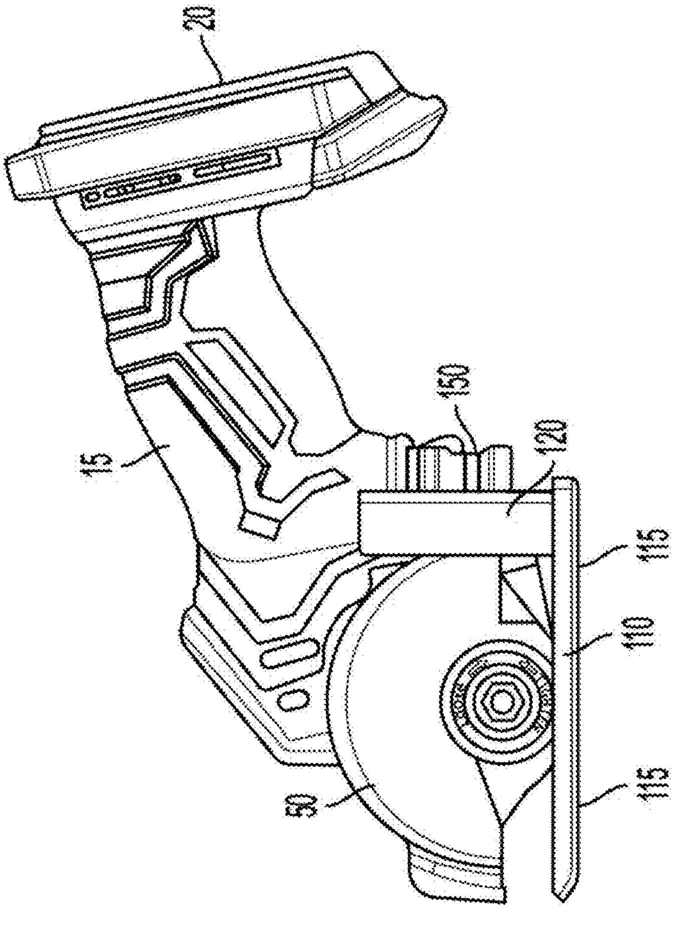
FIG. 3 is a side view of the exemplary embodiment of a rotary cutting tool.

FIG. 1 illustrates a perspective view of a non-limiting, exemplary embodiment of a hand-held cutting tool 10 that may be referred to as a cut-off tool. FIG. 2 illustrates another perspective view of the cutting tool 10 and FIG. 3 illustrates a side view of the cutting tool 10. As shown in FIGS. 1-3, the hand-held cutting device 10 includes a handle 15, a motor housing 30 and a battery receptacle portion 20.

A motor is housed in the motor housing 30. The motor drives an output spindle 35. A cutting blade or grinding wheel may be attached to the spindle 35 and driven to cut or grind a workpiece.

Figure 11:
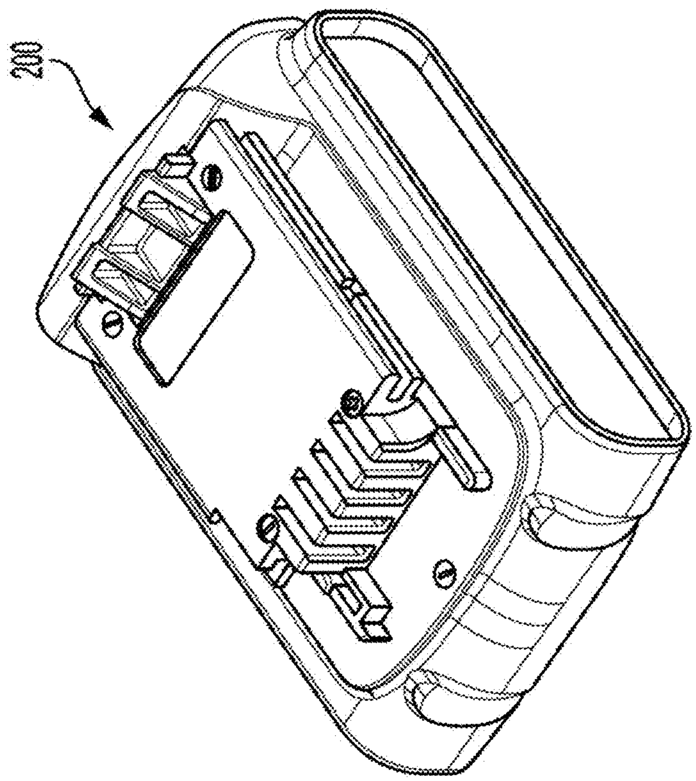
FIG. 11 is a perspective view of an exemplary embodiment of a power tool battery pack.

A removable battery pack 200 (FIG. 11) may be engaged with the battery receptacle portion 20. The battery pack 200 shown in FIG. 11 is a slide-pack style power tool battery pack. Other battery packs may also be used for providing power such tower-style packs. In other embodiments the battery may be an integral battery rather than a removable battery pack. The battery pack 200 provides power to a motor housed in the motor housing 30. The battery pack 200 provides power to the motor housed in the motor housing 30.

The handle 15 is configured to be held by a user. A trigger 16 is located at a forward end of the handle 15. The trigger operates the motor to drive the spindle 35 and so the cutting blade or grinding wheel. The cutting tool 10 may include a gearcase 37 adjacent to the motor housing 30 and between the motor and where the cutting blade or grinding wheel is held.

As shown in FIGS. 1-3, the cutting tool 10 includes a blade guard 50 and a shoe 100. The shoe 100 is attached to the blade guard 50 by a screw threaded fastener 150. A user may screw or unscrew the fastener 150 to tighten or loosen the shoe 100. The fastener 150 may be loosened to allow the shoe 100 to move up or down and so provide different depths of cut. The fastener 150 may be completely removed to allow the shoe 100 to be removed from the tool 10.

Figure 5:
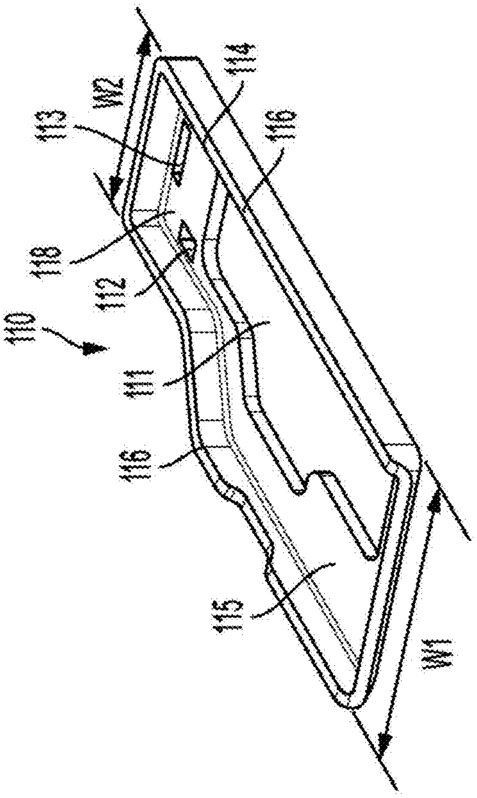
FIG. 5 is a perspective view of a portion of the exemplary embodiment of a shoe for the rotary cutting tool.
Figure 6:
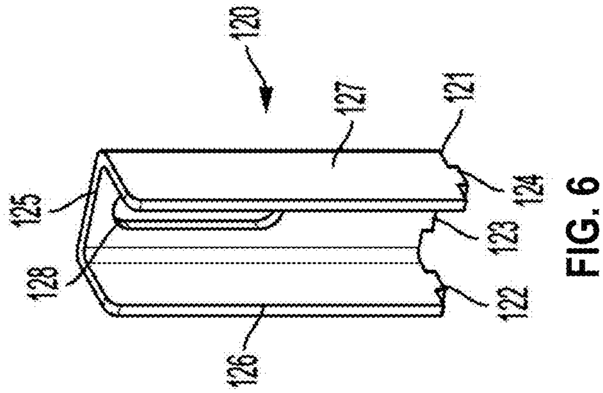
FIG. 6 is a perspective view of a portion of the exemplary embodiment of a shoe for the rotary cutting tool.
Figure 4:
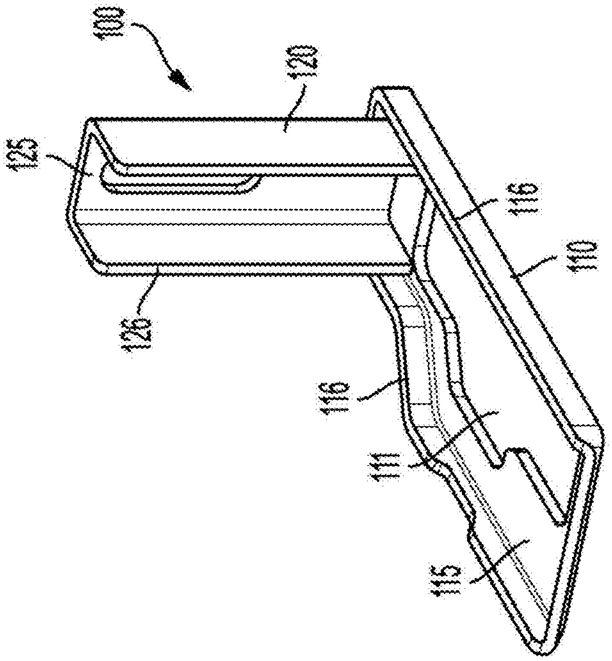
FIG. 4 is a perspective view of the exemplary embodiment of a shoe for the rotary cutting tool.

A perspective drawing of the shoe 100 is shown in FIG. 4 and parts of the shoe 100 are shown in FIGS. 5 and 6. As shown in FIGS. 4-6, the shoe 100 is a simple and compact design. The shoe 100 provides a flat base which may help provide a stable cut.

The shoe 100 is a two-piece stamped metal show. FIG. 5 illustrates a base 110 of the shoe and FIG. 6 illustrates an attachment part 120 of the shoe 100. Base 110 and attachment part 120 are each made of stamped metal and are welded together to create the shoe 100 shown in FIG. 4. The metal may include steel or aluminum.

Base 110 includes an opening 111 through which the saw blade or grinding wheel may project. Base 110 also includes holes 112, 113 and 114 which accept projections 122, 123 and 124, respectively, from the attachment part 120. The base 110 includes a flat portion 115 and a ridge 116 extending around the outside of the base 110. The flat portion 115 of the base provides a stable contact against a workpiece.

The attachment part 120 includes a central portion 125 and two side portions 126 and 127. A slot 128 is formed in the central portion 125. The previously discussed fastener 150 may project through the slot and into the blade guard 50. The attachment part 120 also includes three projections 122, 123 and 124. As discussed above, the projections 122, 123 and 124 fit into the holes 112, 113 and 114. The side portions 126 and 127 are generally parallel to one another and perpendicular to the central portion 125.

The shoe 100 is formed by forming the base 110 and the attachment part 120 separately. Then, the attachment part 120 is inserted into the base 110. In particular, the projections 122, 123 and 124 are inserted into holes 112, 113 and 114. The base 110 and the attachment part 120 are then welded together. The base 110 and the attachment part 120 may be welded together at the connection of the projections

122, 123, 124 and the holes 112, 113 and 114. Welding in this manner provides a strong connection between the two parts 110 and 120. Additionally, the combination of the holes 112, 113 and 144 and projections 122, 123 and 124 provide a reliable location of the two parts. Additionally, the attachment part 120 has a bottom surface 121 which contacts a surface 118 of the base portion providing a stable surface to surface contact in addition to the connection through the holes 112, 113 and 144 and projections 122, 123 and 124.

In other embodiments, the base 110 and the attachment part 120 may be secured together by other means, such as by an adhesive or fastener.

The base 110 may have a front width W1 and a rear width W2. The front width W1 may be greater than the rear width W2. The front width W1 may be less than 10 centimeters (cm), less than 8 cm, less than 6 cm, less than 5 cm or less than 4 cm.

Figure 8:
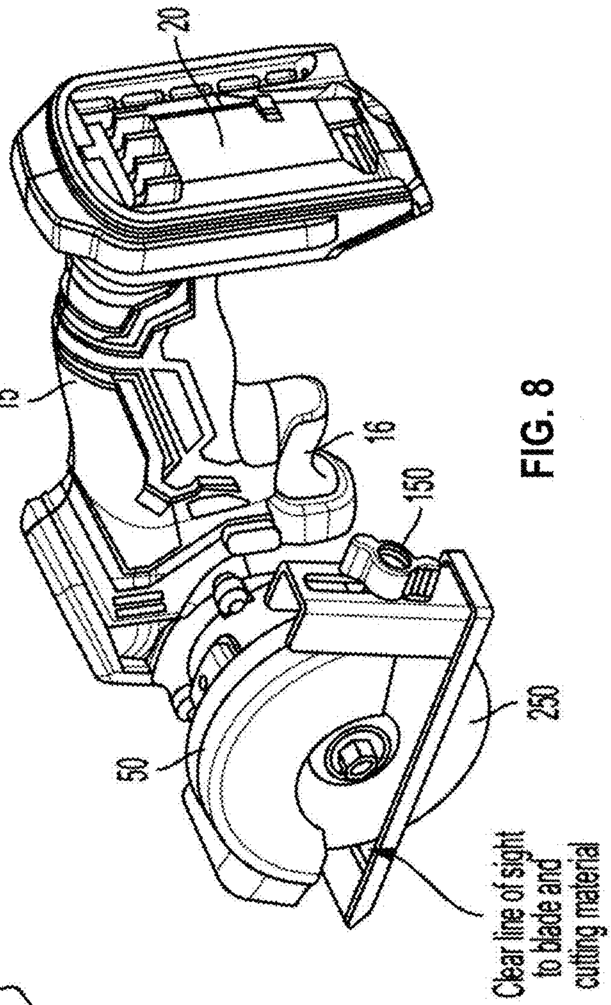
FIG. 8 is a perspective view of the exemplary embodiment of a shoe for the rotary cutting tool.
Figure 7:
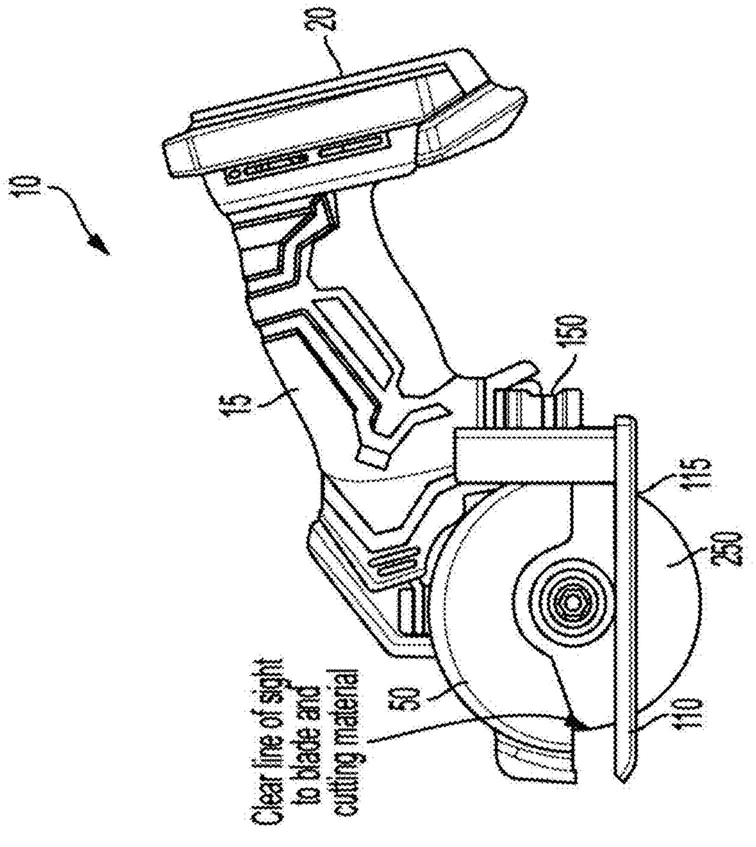
FIG. 7 is a side view of the exemplary embodiment of a rotary cutting tool.
Figure 9:
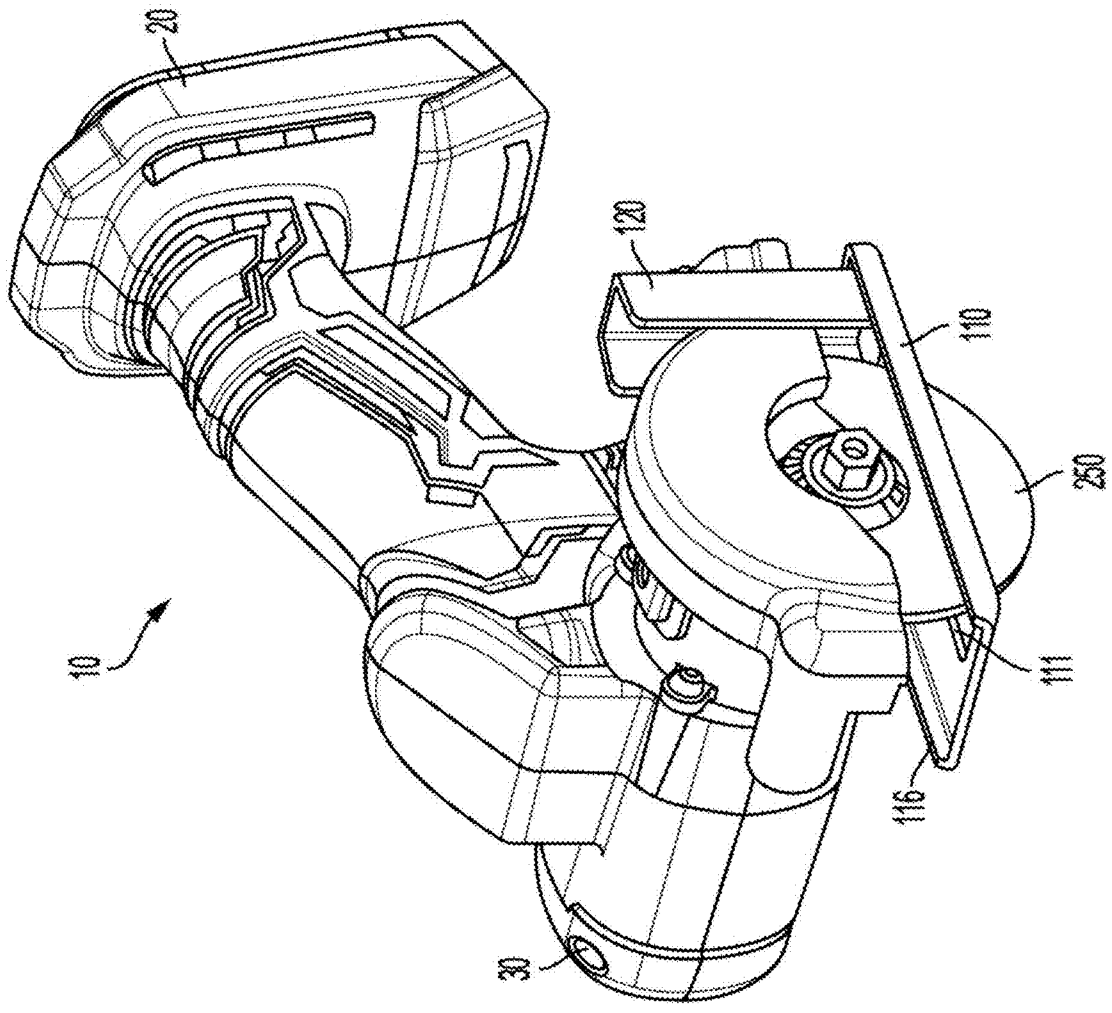
FIG. 9 is a perspective view of the exemplary embodiment of a shoe for the rotary cutting tool.

FIGS. 7-9 illustrate the cutting tool 10 with a cutting wheel 250. As shown, the cutting wheel 250 projects through the shoe 100. In particular, the blade 250 projects through a hole 111 in the base 110 of the shoe 100. The shoe 200 determines a depth of cut. The hole 111 is positioned to provide a clear light of sight to the cutting wheel 250 where it cuts or grinds a workpiece, such as metal, tile, plastic or another workpiece material. The cutting wheel may be any of a variety of known cutting wheels that cut or grind various materials and may be any of a variety of sizes. In the exemplary embodiment, the cutting wheel 250 may be a 3" cutting wheel. In other exemplary embodiments, the cutting wheel 250 may be larger or smaller.

Figure 10:
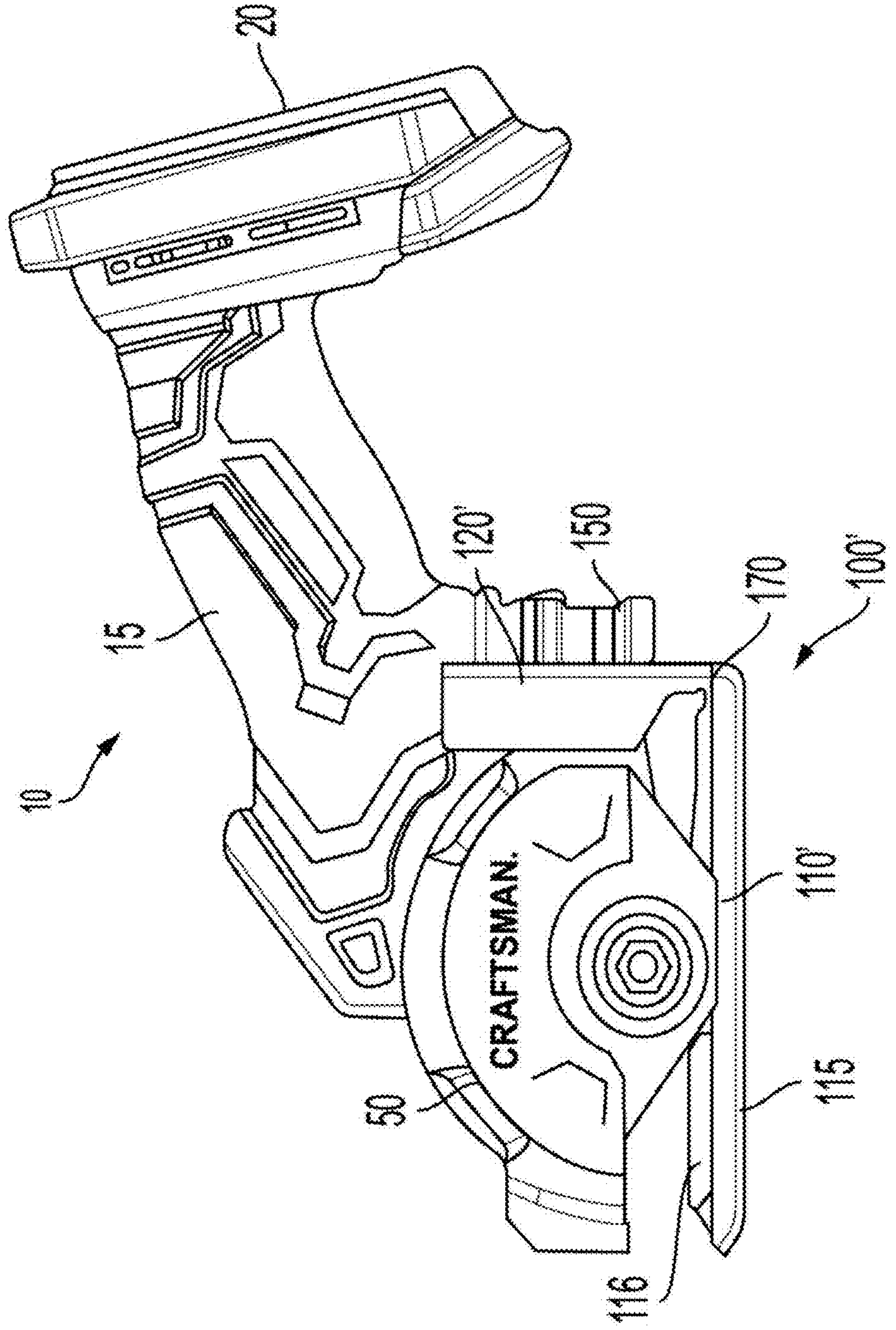
FIG. 10 is a side view of the exemplary embodiment of a rotary cutting tool with another exemplary embodiment of a shoe.

FIG. 10 illustrates the cutting tool 10 with another exemplary embodiment of shoe 100'. The exemplary embodiment shoe 100' is similar to the shoe 100 unless otherwise noted. For example, the shoe 100' has front widths W1 and rear widths W2 as described above with respect to shoe 100. Additionally, the shoe 100' has an opening 111 and a slot 128 as described above with respect to shoe 100. Similarly, the attachment part 120' has a similar structure as attachment part 120 and base 110' has a similar structure as base 110, unless otherwise noted. For example, the base 110' provides a flat base 115 for cutting and has a lip 116.

The shoe 100' differs from the shoe 100 in that the shoe 100' is formed as a single piece and then bent at corner 170. Accordingly, the attachment part 120' and base 110' do not have to be welded, adhered or otherwise fastened together. The shoe 100' may be a single piece of stamped metal. The shoe 100' may be formed generally flat and the attachment part 120' may be bent relative to the base 110' to provide the corner 170 such that the attachment part 120' is generally perpendicular to the base 110'.

Figure 12:
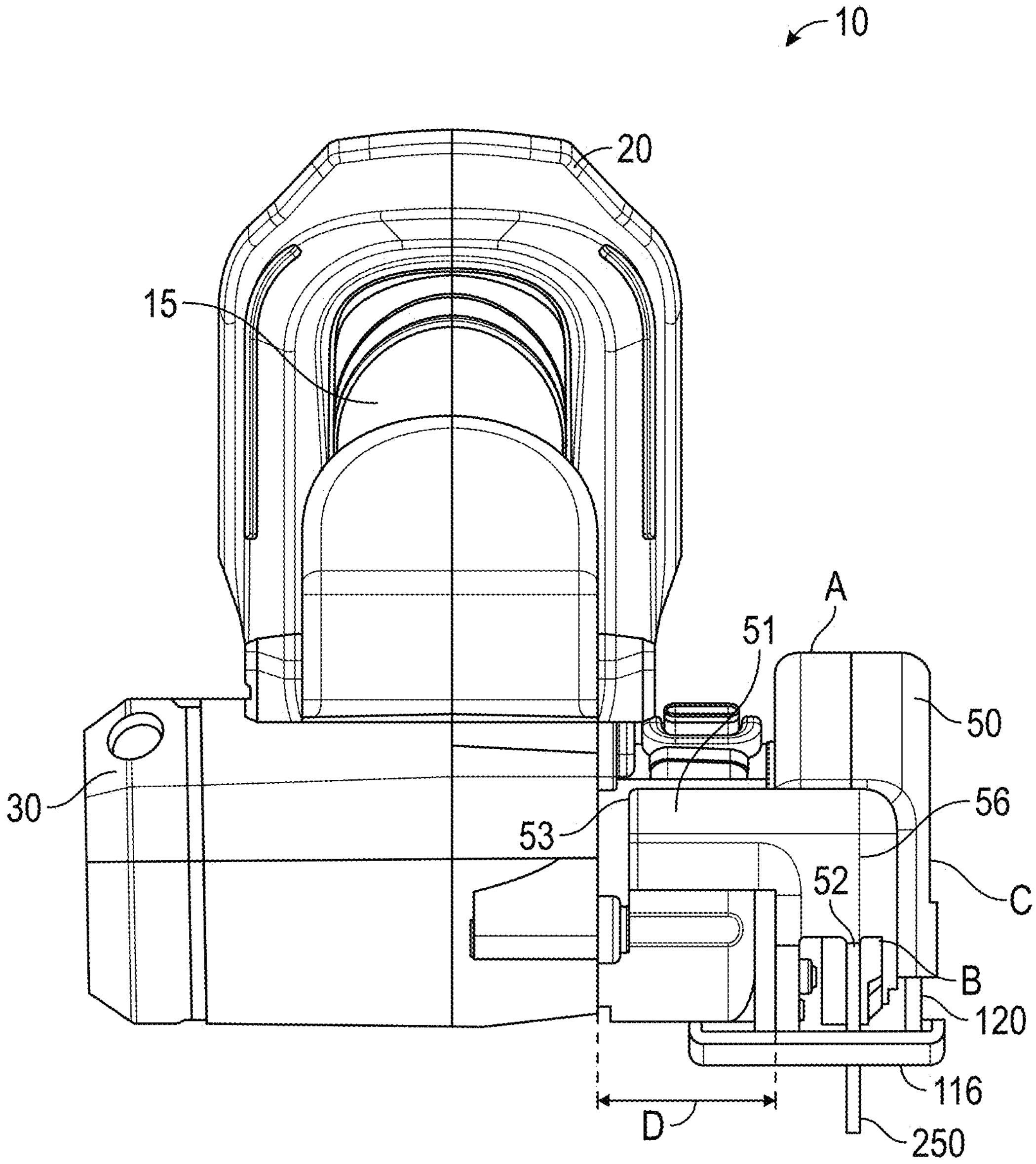
FIG. 12 is a front view of the exemplary embodiment of the rotary tool.
Figure 13:
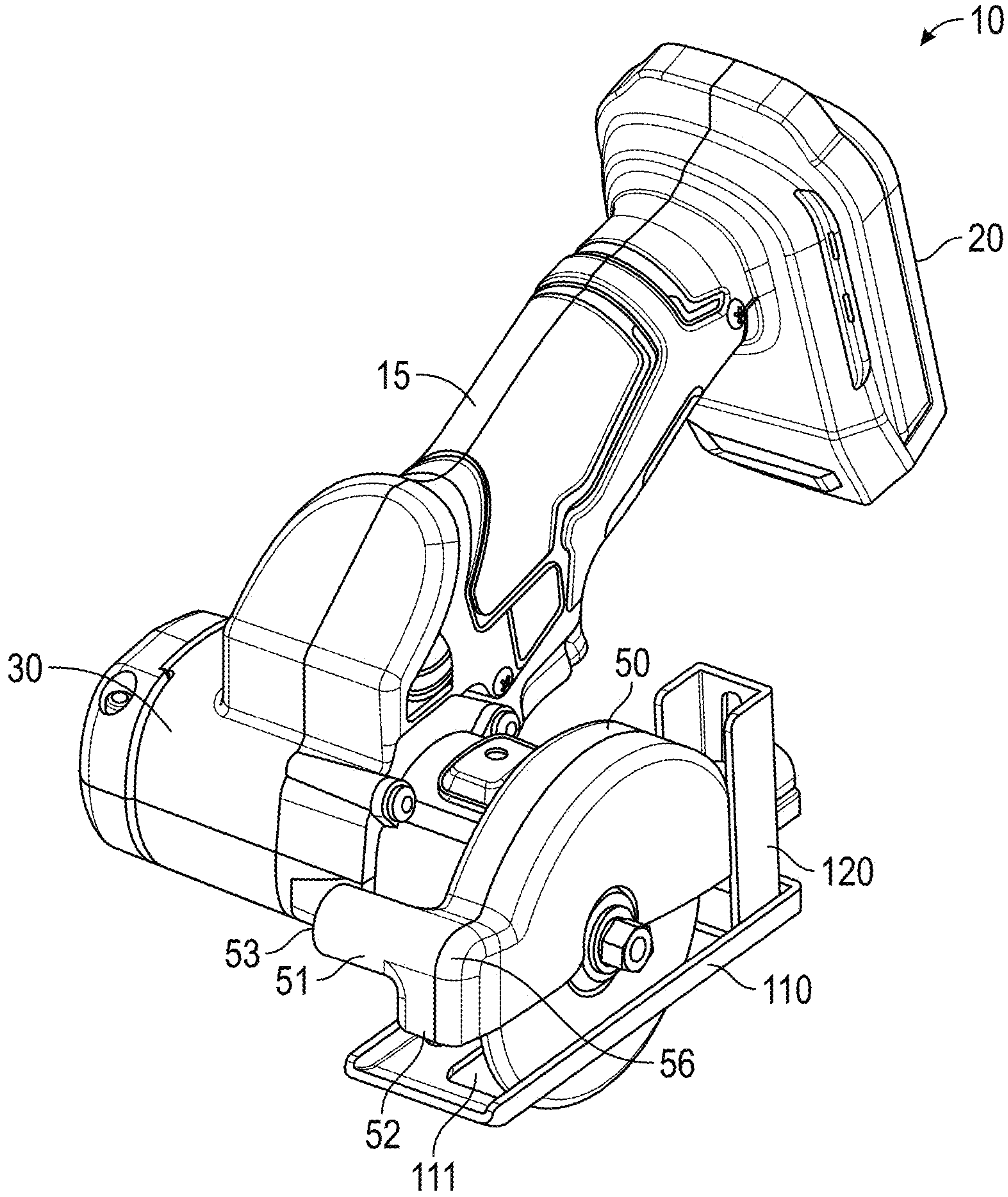
FIG. 13 is another perspective view of the exemplary embodiment of the rotary tool.
Figure 14:
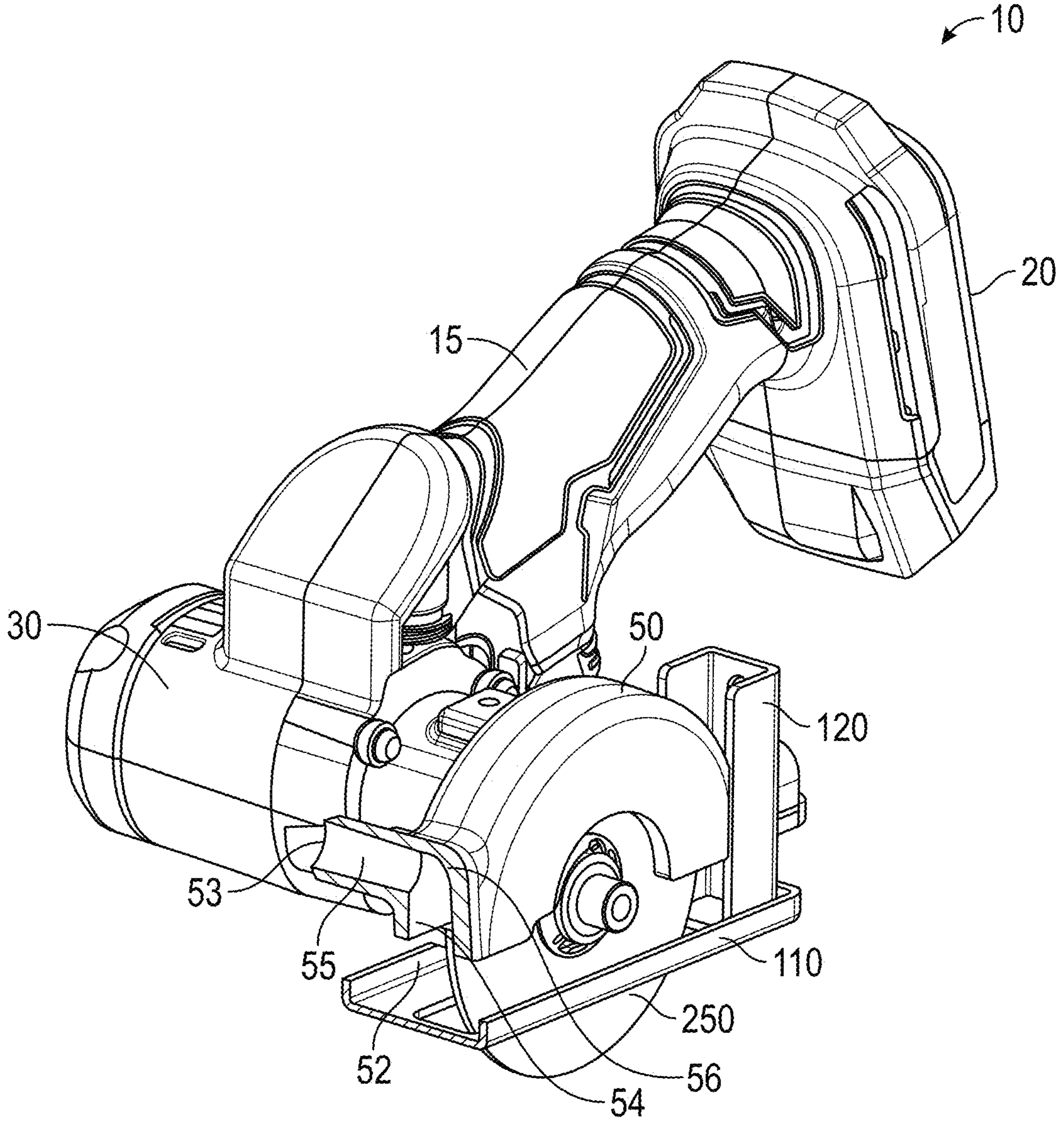
FIG. 14 is another perspective view of the exemplary embodiment of the rotary tool.

FIGS. 12-19 illustrate the cutting tool 10 dust removal. FIGS. 12-14 illustrate the structure and operation of the dust port 51. FIGS. 15-19 illustrate an exemplary embodiment of a dust port adapter 300 and its cooperation with the dust port 51 for dust removal.

As shown in FIGS. 12-14, the cutting tool 10 includes a dust port 51. The dust port 51 has an inlet 52 and an outlet 53. As shown in FIGS. 13 and 14, the dust inlet 52 is located at a forward edge of the cutting wheel 250. Dust created from cutting or grinding a workpiece material is directed by the wheel 250 towards the inlet 52 when the wheel 250 is rotating in a clockwise direction. When the well 250 is rotating in a counter-clockwise direction, the dust may travel from a rear end of the wheel 250 up and around an internal circumference of the blade guard 50 and into the dust port 51.

The dust port 51 has a vertical portion 54 and a horizontal portion 55 transverse to the vertical portion 54. Accordingly, dust enters into the dust port at the inlet 52, travels upwardly in the vertical portion 54, bends around at corner 56, enters into the horizontal portion 55 and exits the dust port 51 at outlet 53. Outlet 53 directs the dust in a direction generally parallel to a rotational axis of the wheel 250. As shown in FIGS. 12-14, the outlet 53 directs dust away from the point of cut and away from the operator. The vertical portion 54 helps to remove the dust from the point of cut in a vertical direction. The horizontal portion 55 helps to move the dust away from the point of cut in a horizontal direction and also helps to direct airflow so that the airflow and dust will continue in a generally horizontal direction upon exit from the outlet 53. This helps to provide a good line-of-sight for the operator. The horizontal portion 55 may be at least 5 millimeters (mm) long or at least 10 mm long so as to provide distance from the point of cut and direction to the dust and airflow. As will be appreciate, after exit from the outlet 53, the airflow and dust will begin to disperse as they move away from the outlet 53 and are no longer constrained by the dust port 51.

As can be seen particularly in the front view of FIG. 12, a central axis C of the outlet 53 of the dust port 51 is below a top edge A of the guard 50 and above a bottom B of the guard 50. In the exemplary embodiment, the central axis C of the outlet 53 is closer to the bottom B of the guard 50 than the top A of the guard 50.

The central axis C may be within 30 millimeters (mm) of centrally located between the bottom B and the top A of the guard 50. That is, if the distance between A and B is 100 mm, centrally located would be 50 mm from A and 50 mm from B. The central axis C may be within 30 mm of centrally located, so in a range of 20 to 80 mm from A and 20 to 80 mm from B. In other exemplary embodiments, the central axis C may be within 20 millimeters (mm) of centrally located between the bottom B and the top A of the guard 50; or the central axis C may be within 10 millimeters (mm) of centrally located between the bottom B and the top A of the guard 50.

The inlet 52 of the dust port 50 is at the bottom edge of the guard 50.

Figure 15:
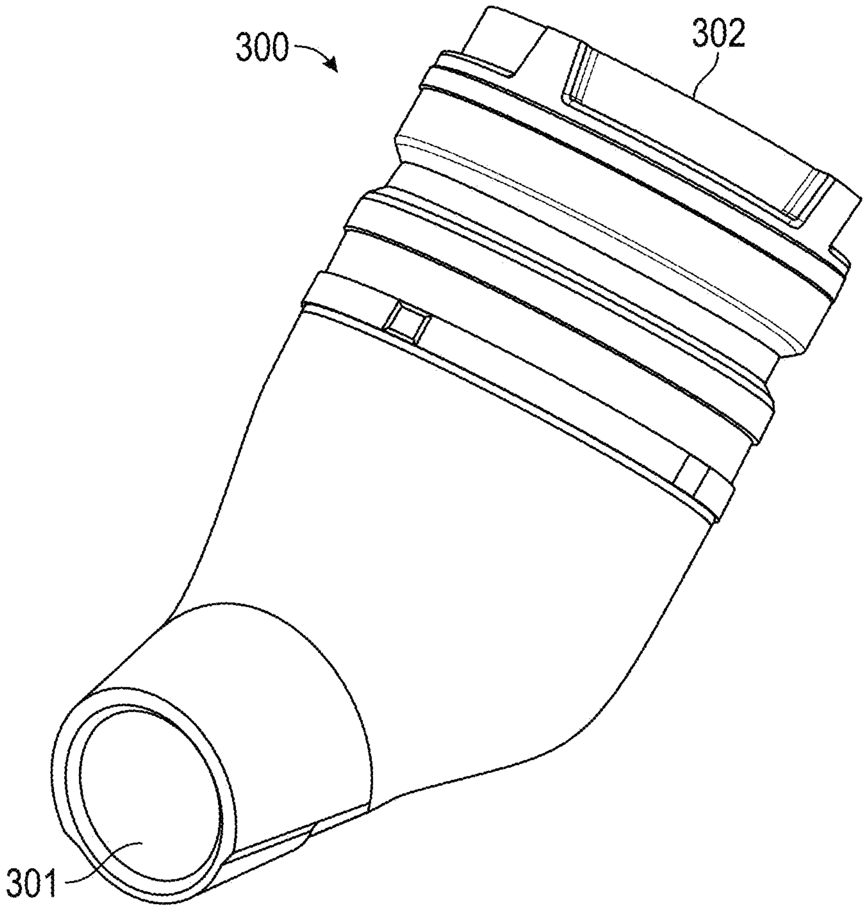
FIG. 15 is a perspective view of an exemplary embodiment of a dust port adapter for the rotary tool.

FIG. 15 illustrates a dust port adapter 300. The dust port adapter 300 directs dust from the dust port 51 to a vacuum or other dust collection device.

As shown in FIG. 15, the dust port adapter 300 includes an adapter inlet 301 and an adapter outlet 302. The adapter inlet 301 is sized and configured to engage the outlet 53 of the dust port 51 and the adapter outlet 302 is configured and sized to engage with a vacuum or other dust collection device such as a dust box or dust bag. The adapter outlet 302 may be sized to engage with one or more standard sized vacuum connections. The adapter outlet 302 may be configured to have a friction fit with a vacuum hose. Other engagements may be used.

Figure 16:
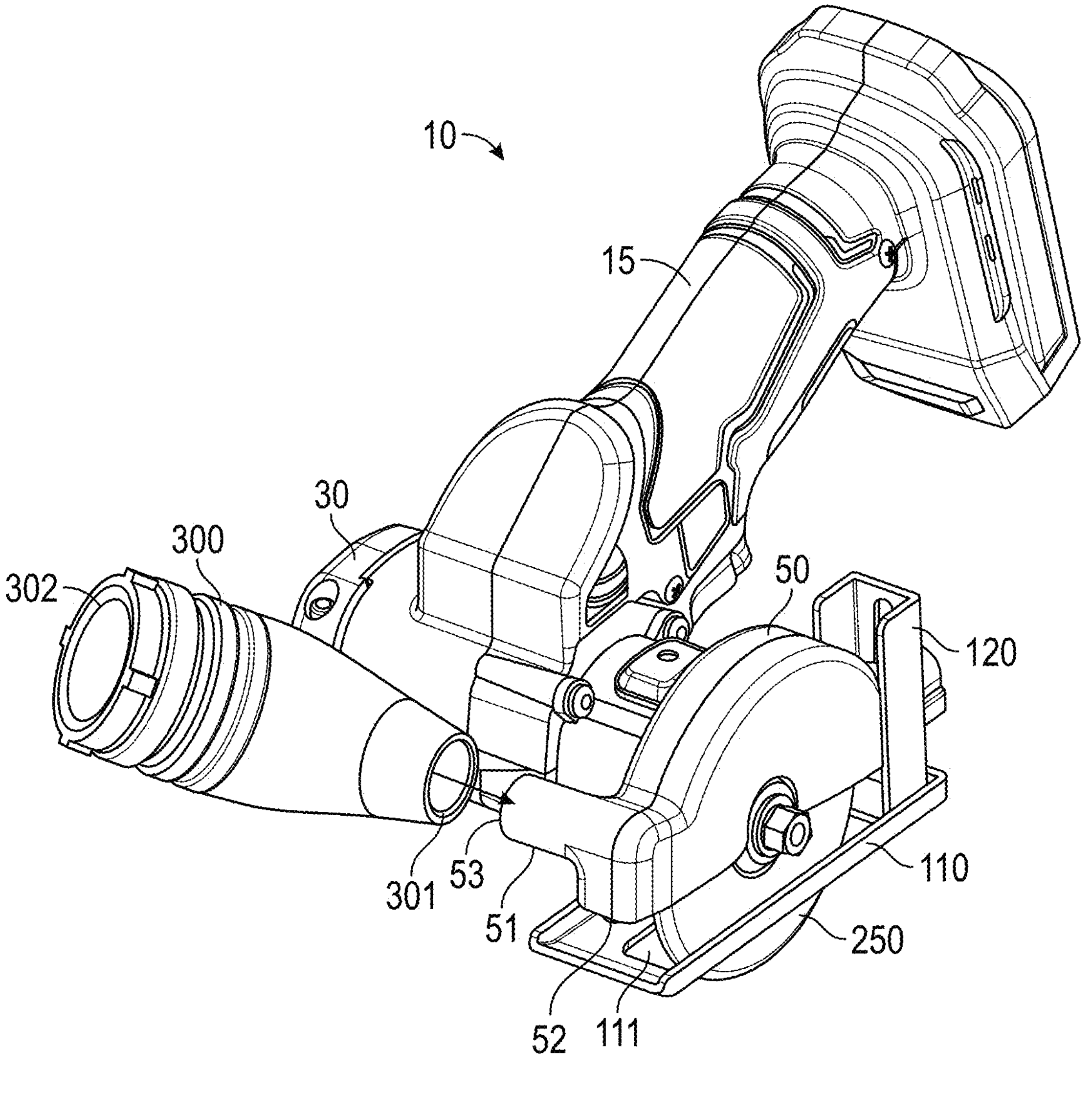
FIG. 16 is a perspective view of an exemplary embodiment of the rotary tool.
Figure 17:
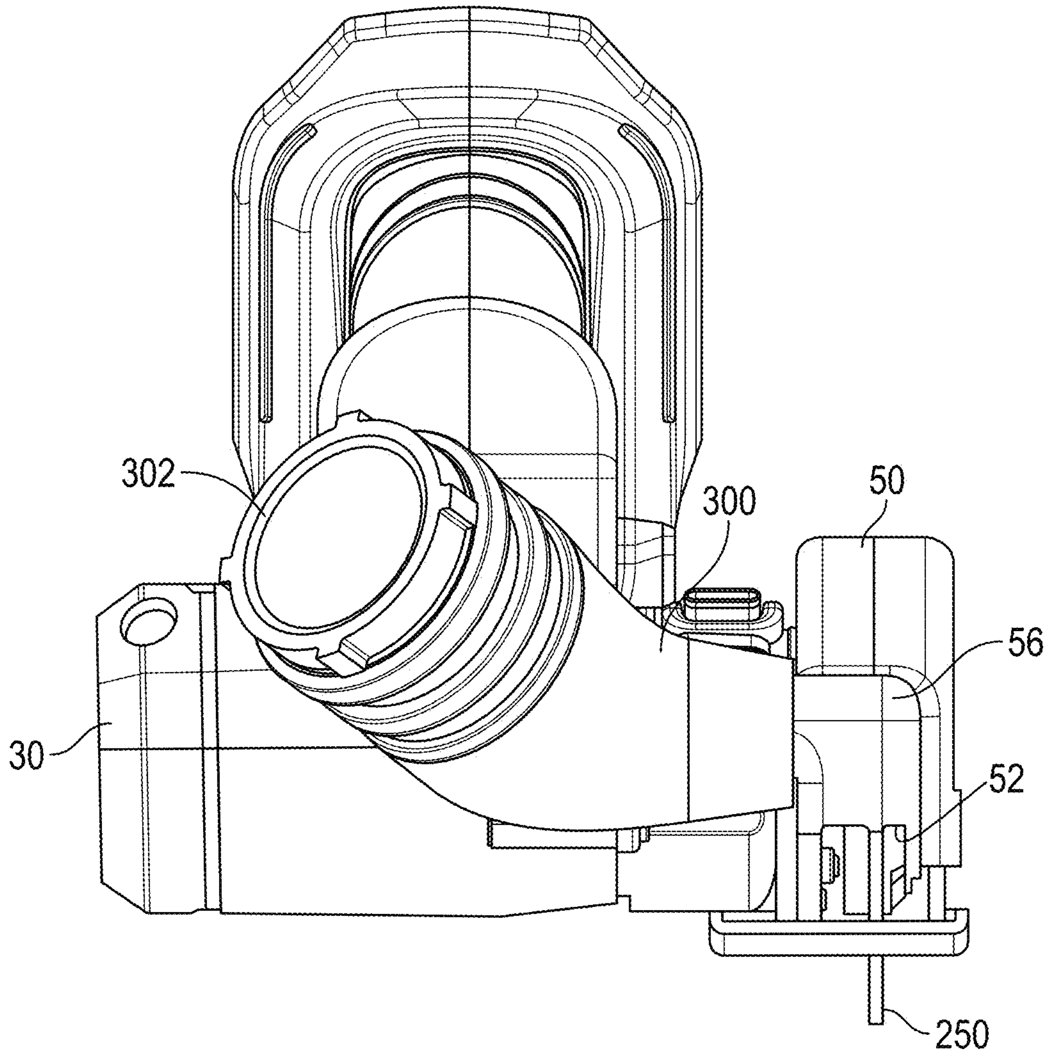
FIG. 17 is a front view of the exemplary embodiment of the rotary tool with the exemplary embodiment of the adapter.

FIG. 16 illustrates the dust port adapter 300 in a position to be engaged with the dust port 51. FIG. 17 illustrates a front view of the cutting tool 10 with the adapter port 300 engaged with the dust port 51. As shown in FIG. 16, the adapter 300 is over the dust port 501.

Figure 18:
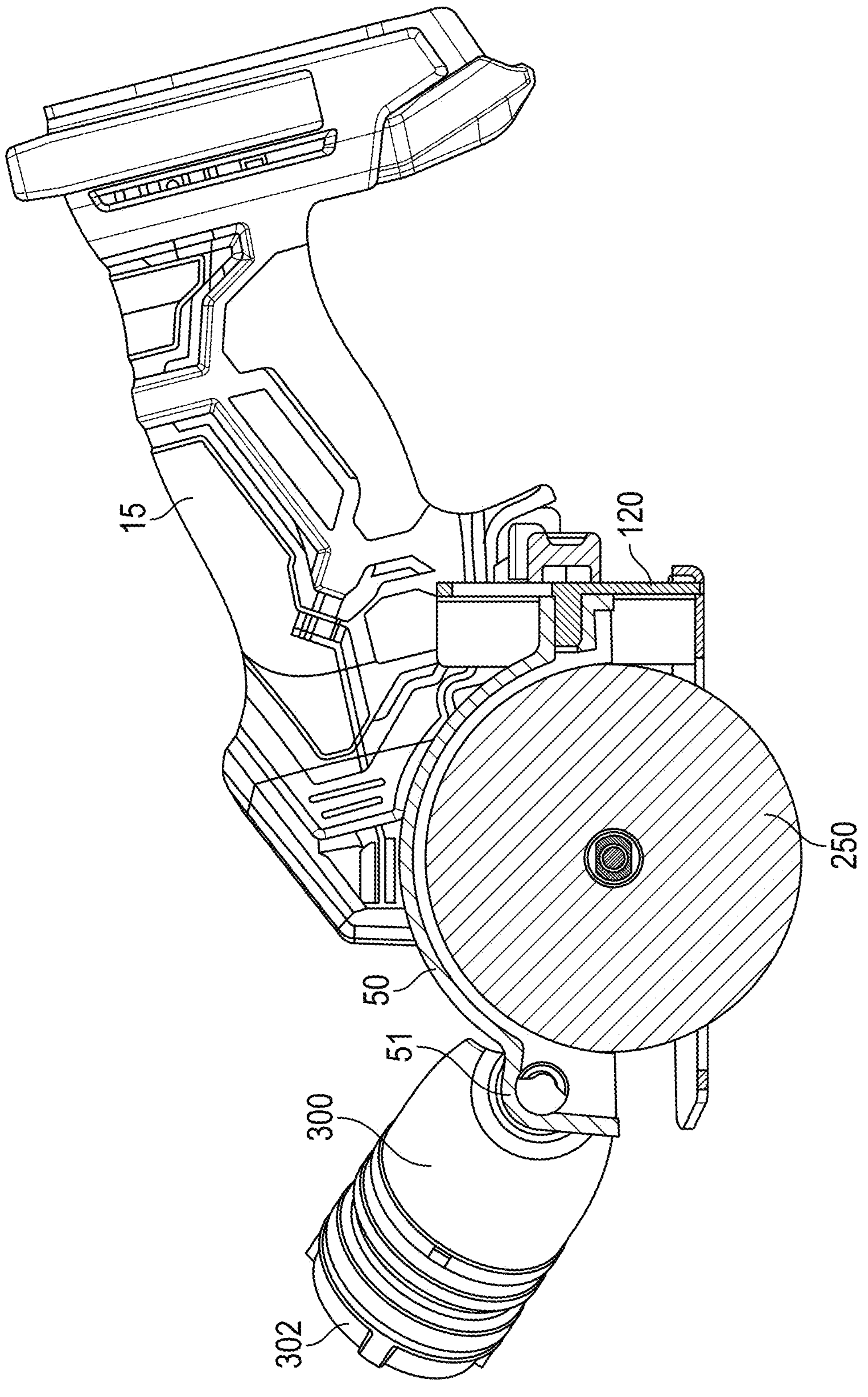
FIG. 18 is a side view of the exemplary embodiment of the rotary tool with the exemplary embodiment of the adapter with a partial cut-away.
Figure 19:
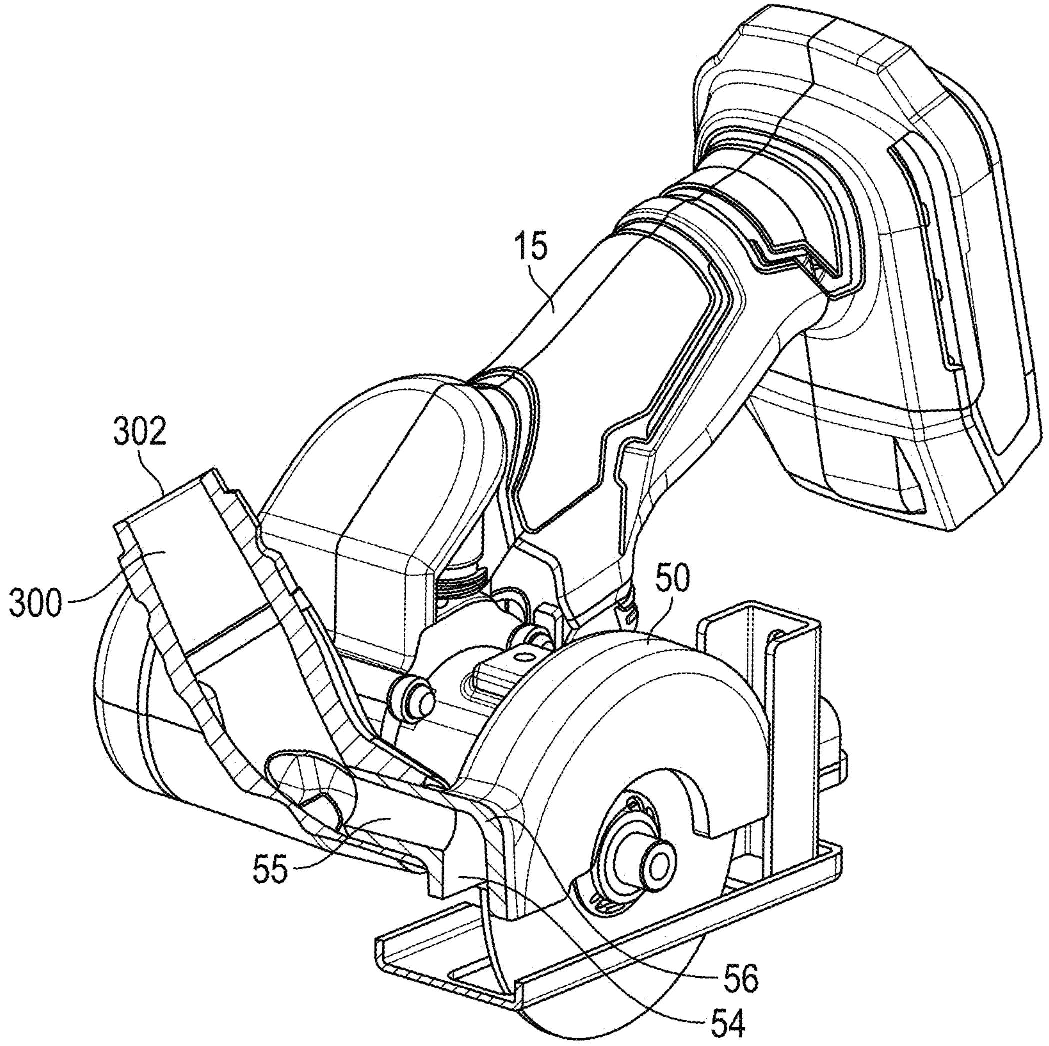
FIG. 19 is a side view of the exemplary embodiment of the rotary tool with the exemplary embodiment of the adapter with a partial cut-away.

FIGS. 18 and 19 include partial cut-away views to help illustrate the path of dust management. FIG. 18 is a side view of the cutting tool 10 with the guard 50 cut away. As shown, air is directed to the dust port 51 by the cutting wheel 250 when the cutting wheel is rotating in a clockwise direction as shown by the arrows in FIG. 18 as previously discussed. Since the dust adapter 300 is engaged with the dust port 51, the airflow and dust is then directed through the adapter 300 and out of the adapter at the adapter outlet 302 which may be selectively connected to a vacuum or other dust collection device, as discussed above.

FIG. 19 illustrates a perspective view of the cutting tool 10 with a portion of the dust port 51 and adapter 300 cut-away to show cross-sections of those elements. As shown, the dust port 51 is engaged inside the adapter 300 such that dust and airflow from the dust port 51 is directed to the adapter 300.

Although described by way of exemplary embodiments, it is understood that the words which have been used herein are words of description, rather an words of limitation. Although the description provided above provides detail for the purpose of illustration based on what is currently considered to be the most practical and preferred embodiments, it is to be understood that such detail is solely for that purpose and that the disclosure is not limited to the expressly disclosed embodiments, but, on the contrary, is intended to cover modifications and equivalent arrangements that are within the spirit and scope of the appended claims It is to be understood that the present disclosure contemplates that, to the extent possible, one or more features of any embodiment can be combined or exchanged with one or more features of any other embodiment.

What is claimed is:

1. A rotary cutting tool, comprising:
- a battery pack receptacle;
- a handle;
- a motor disposed on a first side of the rotary cutting tool;
- a cutting or grinding wheel driven by the motor and disposed on a second side of the rotary cutting tool;
- a blade guard surrounding the cutting or grinding wheel; and
- a shoe,
- wherein the shoe comprises a base and an attachment portion,
- wherein the base comprises a flat portion and is configured to abut a workpiece and provide a depth of cut,
- wherein the attachment portion is perpendicular to the base,
- wherein the blade guard comprises a dust port having a dust port inlet and a dust port outlet, the dust port being configured to direct dust through the dust port outlet in a direction from the second side of the rotary cutting tool to the first side of the rotary cutting tool, wherein the blade guard has a forward end and a rearward end opposite the forward end, the rearward end of the blade guard is located closer to the battery pack receptacle than the forward end of the blade guard, and the dust port is disposed at the forward end of the blade guard, wherein the dust port includes a vertical portion and a horizontal portion, the vertical portion extending from the dust port inlet to the horizontal portion in a direction substantially perpendicular to a rotational axis of the motor, the horizontal portion extending from the vertical portion to the dust port outlet in a direction substantially parallel to the rotational axis of the motor.

2. The rotary cutting tool of claim 1, wherein the dust port comprises a horizontal portion that is substantially parallel to a rotational axis of the motor.

3. The rotary cutting tool of claim 2, wherein the dust port outlet is located at an end of the horizontal portion.

4. The rotary cutting tool of claim 3, wherein the dust port further comprises a vertical portion in communication with the horizontal portion.

5. The rotary cutting tool of claim 4, wherein the vertical portion is transverse to the horizontal portion, and the dust port inlet is located at an end of the vertical portion.

6. The rotary cutting tool of claim 5, wherein a central axis of the dust port outlet is below a top edge of the blade guard.

7. The rotary cutting tool of claim 6, wherein the central axis of the dust port outlet is above a bottom edge of the blade guard.

8. The rotary cutting tool of claim 7, wherein the central axis of the dust port outlet is closer to the bottom edge of the blade guard than the top edge of the blade guard.

9. The rotary cutting tool of claim 8, wherein the horizontal portion of the dust port is at least 5 millimeters long.

10. The rotary cutting tool of claim 9, wherein the horizontal portion of the dust port is at least 10 millimeters long.

11. A rotary cutting tool, comprising:
- a battery pack receptacle;
- a handle;
- a motor disposed on a first side of the rotary cutting tool;
- a cutting or grinding wheel driven by the motor, configured to cut or grind a workpiece, and disposed on a second side of the rotary cutting tool;
- a blade guard surrounding the cutting or grinding wheel; and
- a shoe,
- wherein the shoe comprises a base and an attachment portion,
- wherein the base comprises a flat portion configured to abut the workpiece and provide a depth of cut,
- wherein the attachment portion is perpendicular to the base,
- wherein the base has a front width and a rear width,
- wherein the front width is 8 cm or less, and
- wherein the blade guard comprises a dust port having a dust port inlet and a dust port outlet, the dust port being configured to direct dust through the dust port outlet in a direction from the second side of the rotary cutting tool to the first side of the rotary cutting tool, wherein the blade guard has a forward end and a rearward end opposite the forward end, the rearward end of the blade guard is located closer to the battery pack receptacle than the forward end of the blade guard, and the dust port is disposed at the forward end of the blade guard, wherein the dust port includes a vertical portion and a horizontal portion, the vertical portion extending from the dust port inlet to the horizontal portion in a direction substantially perpendicular to a rotational axis of the motor, the horizontal portion extending from the vertical portion to the dust port outlet in a direction substantially parallel to the rotational axis of the motor.

12. The rotary cutting tool of claim 11, wherein the dust port comprises a horizontal portion that is substantially parallel to a rotational axis of the motor.

13. The rotary cutting tool of claim 12, wherein the dust port outlet is located at an end of the horizontal portion.

14. The rotary cutting tool of claim 13, wherein the dust port further comprises a vertical portion in communication with the horizontal portion.

15. The rotary cutting tool of claim 14, wherein the vertical portion is transverse to the horizontal portion, and the dust port inlet is located at an end of the vertical portion.

16. The rotary cutting tool of claim 15, wherein a central axis of the dust port outlet is below a top edge of the blade guard.

* * * * *